(12) United States Patent
Johnson et al.

(10) Patent No.: US 11,628,566 B2
(45) Date of Patent: Apr. 18, 2023

(54) MANIPULATING FRACTURABLE AND DEFORMABLE MATERIALS USING ARTICULATED MANIPULATORS

(71) Applicant: The Charles Stark Draper Laboratory, Inc., Cambridge, MA (US)

(72) Inventors: David M. S. Johnson, Cambridge, MA (US); Syler Wagner, Somerville, MA (US); Steven Lines, Brookline, MA (US); Mitchell Hebert, Littleton, CO (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 76 days.

(21) Appl. No.: 16/570,100

(22) Filed: Sep. 13, 2019

(65) Prior Publication Data

US 2020/0086485 A1 Mar. 19, 2020

Related U.S. Application Data

(60) Provisional application No. 62/731,398, filed on Sep. 14, 2018, provisional application No. 62/730,947, (Continued)

(51) Int. Cl.
 *B25J 9/16* (2006.01)
 *B25J 13/00* (2006.01)
 (Continued)

(52) U.S. Cl.
 CPC .......... *B25J 9/1666* (2013.01); *B25J 9/0009* (2013.01); *B25J 9/16* (2013.01); *B25J 9/161* (2013.01);
 (Continued)

(58) Field of Classification Search
 CPC ................... B25J 9/16; B25J 11/00
 See application file for complete search history.

(56) References Cited

U.S. PATENT DOCUMENTS

| | | | |
|---|---|---|---|
| 4,512,709 A | 4/1985 | Hennekes | |
| 4,604,787 A | 8/1986 | Silvers | |

(Continued)

FOREIGN PATENT DOCUMENTS

| | | | |
|---|---|---|---|
| CN | 106313068 A | 1/2017 | |
| CN | 107092209 A | 8/2017 | |

(Continued)

OTHER PUBLICATIONS

Anandan, T.M., "The Shrinking Footprint of Robot Safety", Robotics Online, Oct. 6, 2014. https://www.robotics.org/content-detail.cfm/Industrial-Robotics-Industry-Insights/The-Shrinking-Footprint-of-Robot-Safety/content_id/5059.

(Continued)

*Primary Examiner* — Kira Nguyen
(74) *Attorney, Agent, or Firm* — Hamilton, Brook, Smith & Reynolds, P.C.

(57) ABSTRACT

In an embodiment, a method and system use various sensors to determine a shape of a collection of materials (e.g., foodstuffs). A controller can determine a trajectory which achieves the desired end-state, possibly chosen from a set of feasible, collision-free trajectories to execute, and a robot executes that trajectory. The robot, executing that trajectory, scoops, grabs, or otherwise acquires the desired amount of material from the collection of materials at a desired location. The robot then deposits the collected material in the desired receptacle at a specific location and orientation.

20 Claims, 5 Drawing Sheets

Related U.S. Application Data filed on Sep. 13, 2018, provisional application No. 62/730,918, filed on Sep. 13, 2018, provisional application No. 62/730,933, filed on Sep. 13, 2018, provisional application No. 62/730,703, filed on Sep. 13, 2018, provisional application No. 62/730,934, filed on Sep. 13, 2018.

(51) Int. Cl.

| | |
|---|---|
| B25J 13/08 | (2006.01) |
| G06N 3/08 | (2023.01) |
| G10L 15/22 | (2006.01) |
| B65G 1/137 | (2006.01) |
| B25J 9/00 | (2006.01) |
| B25J 15/00 | (2006.01) |
| G06Q 10/0631 | (2023.01) |
| B25J 11/00 | (2006.01) |
| B25J 15/04 | (2006.01) |
| B25J 19/02 | (2006.01) |
| G05D 1/02 | (2020.01) |
| B25J 19/00 | (2006.01) |
| G06V 40/20 | (2022.01) |
| H04L 67/12 | (2022.01) |
| G05B 19/4061 | (2006.01) |
| A47J 44/00 | (2006.01) |

(52) U.S. Cl.
CPC ........... *B25J 9/1633* (2013.01); *B25J 9/1653* (2013.01); *B25J 9/1664* (2013.01); *B25J 9/1674* (2013.01); *B25J 9/1676* (2013.01); *B25J 9/1682* (2013.01); *B25J 9/1687* (2013.01); *B25J 9/1697* (2013.01); *B25J 11/0045* (2013.01); *B25J 13/003* (2013.01); *B25J 13/085* (2013.01); *B25J 13/088* (2013.01); *B25J 15/0052* (2013.01); *B25J 15/0408* (2013.01); *B25J 19/0083* (2013.01); *B25J 19/023* (2013.01); *B65G 1/137* (2013.01); *G05D 1/02* (2013.01); *G06N 3/08* (2013.01); *G06Q 10/06316* (2013.01); *G06V 40/28* (2022.01); *G10L 15/22* (2013.01); *A47J 44/00* (2013.01); *G05B 19/4061* (2013.01); *G05B 2219/32335* (2013.01); *G05B 2219/39001* (2013.01); *G05B 2219/39091* (2013.01); *G05B 2219/39319* (2013.01); *G05B 2219/39342* (2013.01); *G05B 2219/39468* (2013.01); *G05B 2219/40201* (2013.01); *G05B 2219/40202* (2013.01); *G05B 2219/40411* (2013.01); *G05B 2219/40497* (2013.01); *G05B 2219/45111* (2013.01); *G05B 2219/49157* (2013.01); *G05B 2219/50391* (2013.01); *H04L 67/12* (2013.01)

(56) References Cited

U.S. PATENT DOCUMENTS

| | | |
|---|---|---|
| 4,611,377 A | 9/1986 | McCormick |
| 4,624,043 A | 11/1986 | Bennett |
| 4,676,142 A | 6/1987 | McCormick |
| 4,875,275 A | 10/1989 | Hutchinson et al. |
| 4,896,357 A | 1/1990 | Hatano |
| 4,904,514 A | 2/1990 | Morrison et al. |
| 5,018,266 A | 5/1991 | Hutchinson et al. |
| 5,044,063 A | 9/1991 | Voellmer |
| 5,131,706 A | 7/1992 | Appleberry |
| 5,136,223 A | 8/1992 | Karakama |
| 5,360,249 A | 11/1994 | Monforte et al. |
| 5,396,346 A | 3/1995 | Nakayama |
| 5,774,841 A | 6/1998 | Salazar et al. |
| 5,879,277 A | 3/1999 | Dettman et al. |
| 6,223,110 B1 | 4/2001 | Rowe et al. |
| 6,427,995 B1 | 8/2002 | Steinwall |
| 6,569,070 B1 | 5/2003 | Harrington et al. |
| 6,678,572 B1 | 1/2004 | Oh |
| 3,095,237 A1 | 1/2012 | Habibi et al. |
| 3,186,795 A1 | 11/2015 | Edsinger et al. |
| 9,189,742 B2 | 11/2015 | London |
| 9,259,840 B1 | 2/2016 | Chen |
| 9,346,164 B1 | 5/2016 | Edsinger et al. |
| 9,427,876 B2 | 8/2016 | Mozeika et al. |
| 9,615,066 B1 | 4/2017 | Tran et al. |
| 9,621,984 B1 | 4/2017 | Chu |
| 9,659,225 B2 | 5/2017 | Joshi et al. |
| 9,744,668 B1 | 8/2017 | Russell et al. |
| 9,547,306 B2 | 10/2017 | Sepulveda |
| 9,800,973 B1 | 10/2017 | Chatot et al. |
| 9,801,517 B2 | 10/2017 | High et al. |
| 10,131,053 B1 | 11/2018 | Sampedro et al. |
| 10,427,306 B1 | 10/2019 | Quinlan et al. |
| 11,016,491 B1 | 5/2021 | Millard |
| 11,116,593 B2 | 9/2021 | Hashimoto et al. |
| 11,351,673 B2 | 6/2022 | Zito et al. |
| 11,571,814 B2 | 2/2023 | Johnson et al. |
| 2002/0144565 A1 | 10/2002 | Ambrose |
| 2002/0151848 A1 | 10/2002 | Capote et al. |
| 2002/0158599 A1 | 10/2002 | Fujita |
| 2002/0181773 A1 | 12/2002 | Higaki et al. |
| 2003/0060930 A1 | 3/2003 | Fjuita |
| 2004/0039483 A1 | 2/2004 | Kemp et al. |
| 2004/0172380 A1 | 9/2004 | Zhang |
| 2005/0004710 A1 | 1/2005 | Shimomura et al. |
| 2005/0171643 A1 | 8/2005 | Sabe et al. |
| 2005/0193901 A1* | 9/2005 | Buehler .................. A47J 44/00 99/468 |
| 2005/0283475 A1 | 12/2005 | Beranek |
| 2006/0137164 A1 | 6/2006 | Kraus |
| 2006/0141200 A1 | 6/2006 | D'Amdreta |
| 2006/0165953 A1 | 7/2006 | Castelli |
| 2007/0233321 A1 | 10/2007 | Suzuki |
| 2007/0274812 A1 | 11/2007 | Ban et al. |
| 2007/0276539 A1 | 11/2007 | Habibi et al. |
| 2008/0059178 A1 | 3/2008 | Yamamoto et al. |
| 2008/0161970 A1 | 7/2008 | Adachi et al. |
| 2008/0177421 A1 | 7/2008 | Cheng et al. |
| 2008/0201016 A1 | 8/2008 | Finlay |
| 2008/0237921 A1 | 10/2008 | Butterworth |
| 2009/0075796 A1 | 3/2009 | Doll |
| 2009/0292298 A1 | 11/2009 | Lin et al. |
| 2010/0114371 A1 | 5/2010 | Tsukaka et al. |
| 2010/0292707 A1 | 11/2010 | Ortmaier |
| 2011/0060462 A1 | 3/2011 | Aurnhammer et al. |
| 2011/0125504 A1 | 5/2011 | Ko et al. |
| 2011/0238212 A1 | 9/2011 | Shirado et al. |
| 2011/0256995 A1 | 10/2011 | Takazakura et al. |
| 2012/0016678 A1 | 1/2012 | Gruber |
| 2012/0255388 A1 | 10/2012 | McClosky |
| 2012/0290134 A1 | 11/2012 | Zhao et al. |
| 2013/0079930 A1 | 3/2013 | Mistry |
| 2013/0103198 A1 | 4/2013 | Nakamoto et al. |
| 2013/0103918 A1 | 4/2013 | Dictos |
| 2014/0067121 A1 | 3/2014 | Brooks |
| 2014/0163736 A1 | 6/2014 | Azizian et al. |
| 2014/0316636 A1 | 10/2014 | Hong et al. |
| 2015/0032260 A1 | 1/2015 | Yoon et al. |
| 2015/0051734 A1 | 2/2015 | Zheng |
| 2015/0052703 A1 | 2/2015 | Lee et al. |
| 2015/0114236 A1* | 4/2015 | Roy ........................ A47J 44/00 901/41 |
| 2015/0148953 A1 | 5/2015 | Laurent et al. |
| 2015/0149175 A1 | 5/2015 | Hirata et al. |
| 2015/0178953 A1 | 5/2015 | Laurent |
| 2015/0277430 A1 | 10/2015 | Linnell et al. |
| 2015/0375402 A1 | 12/2015 | D'Andreta |
| 2016/0016315 A1 | 1/2016 | Kuffner et al. |
| 2016/0073644 A1 | 3/2016 | Dickey |
| 2016/0075023 A1 | 3/2016 | Sisbot |
| 2016/0103202 A1 | 4/2016 | Sumiyoshi et al. |
| 2016/0291571 A1 | 10/2016 | Cristiano |

(56) References Cited

U.S. PATENT DOCUMENTS

| | | | |
|---|---|---|---|
| 2016/0372138 A1 | 12/2016 | Shinkai et al. | |
| 2017/0004406 A1 | 1/2017 | Aghamohammadi | |
| 2017/0080565 A1 | 3/2017 | Dalibard | |
| 2017/0087722 A1 | 3/2017 | Aberg et al. | |
| 2017/0133009 A1 | 5/2017 | Cho et al. | |
| 2017/0168488 A1 | 6/2017 | Wierzynski | |
| 2017/0178352 A1 | 6/2017 | Harmsen et al. | |
| 2017/0326728 A1 | 11/2017 | Prats | |
| 2017/0334066 A1 | 11/2017 | Levine | |
| 2017/0354294 A1* | 12/2017 | Shivaiah | A47J 36/321 |
| 2017/0361461 A1 | 12/2017 | Tan | |
| 2017/0361468 A1 | 12/2017 | Cheuvront et al. | |
| 2018/0043952 A1 | 2/2018 | Ellerman et al. | |
| 2018/0056520 A1 | 3/2018 | Ozaki | |
| 2018/0070776 A1* | 3/2018 | Ganninger | A21C 9/08 |
| 2018/0121994 A1 | 5/2018 | Matsunaga et al. | |
| 2018/0144244 A1 | 5/2018 | Masoud et al. | |
| 2018/0147718 A1* | 5/2018 | Oleynik | G05B 19/42 |
| 2018/0147723 A1 | 5/2018 | Vijayanarasimhan | |
| 2018/0150661 A1* | 5/2018 | Hall | B25J 11/008 |
| 2018/0200014 A1 | 7/2018 | Bonny et al. | |
| 2018/0200885 A1 | 7/2018 | Ikeda et al. | |
| 2018/0202819 A1 | 7/2018 | Mital | |
| 2018/0214221 A1 | 8/2018 | Crawford et al. | |
| 2018/0257221 A1 | 9/2018 | Toothaker et al. | |
| 2018/0275632 A1 | 9/2018 | Zhang et al. | |
| 2018/0338504 A1 | 11/2018 | Lavri et al. | |
| 2018/0345479 A1 | 12/2018 | Martino et al. | |
| 2018/0348783 A1 | 12/2018 | Pitzer et al. | |
| 2018/0354140 A1 | 12/2018 | Watanabe | |
| 2019/0001489 A1 | 1/2019 | Hudson et al. | |
| 2019/0039241 A1 | 2/2019 | Langenfeld et al. | |
| 2019/0049970 A1 | 2/2019 | Djuric et al. | |
| 2019/0056751 A1 | 2/2019 | Ferguson et al. | |
| 2019/0066680 A1 | 2/2019 | Woo et al. | |
| 2019/0212441 A1 | 7/2019 | Casner et al. | |
| 2019/0291277 A1* | 9/2019 | Oleynik | B25J 9/1669 |
| 2019/0310611 A1* | 10/2019 | Jain | B25J 11/00 |
| 2019/0321989 A1 | 10/2019 | Anderson et al. | |
| 2019/0381617 A1 | 12/2019 | Patrini et al. | |
| 2020/0023520 A1 | 1/2020 | Yoshizumi | |
| 2020/0030966 A1* | 1/2020 | Hasegawa | B25J 15/0491 |
| 2020/0047349 A1 | 2/2020 | Sinnet et al. | |
| 2020/0070355 A1 | 3/2020 | Neumann et al. | |
| 2020/0073358 A1 | 3/2020 | Dedkov et al. | |
| 2020/0073367 A1 | 3/2020 | Nguyen et al. | |
| 2020/0086437 A1 | 3/2020 | Johnson | |
| 2020/0086482 A1 | 3/2020 | Johnson | |
| 2020/0086487 A1 | 3/2020 | Johnson | |
| 2020/0086497 A1 | 3/2020 | Johnson | |
| 2020/0086498 A1 | 3/2020 | Johnson | |
| 2020/0086502 A1 | 3/2020 | Johnson | |
| 2020/0086503 A1 | 3/2020 | Johnson | |
| 2020/0086509 A1 | 3/2020 | Johnson | |
| 2020/0087069 A1 | 3/2020 | Johnson | |
| 2020/0090099 A1 | 3/2020 | Johnson | |
| 2020/0298403 A1 | 9/2020 | Nilsson et al. | |
| 2022/0066456 A1 | 3/2022 | Ebrahimi et al. | |

FOREIGN PATENT DOCUMENTS

| | | |
|---|---|---|
| DE | 3723329 A | 1/1988 |
| DE | 3823102 A1 | 1/1990 |
| EP | 138461 A2 | 4/1985 |
| EP | 474881 A1 | 3/1992 |
| EP | 1145804 A1 | 10/2001 |
| EP | 2011610 A2 | 1/2019 |
| FR | 3015334 A1 | 6/2015 |
| GB | 2550396 A | 11/2017 |
| JP | 2004295620 | 10/2004 |
| JP | 200849462 A | 3/2008 |
| JP | 2020028957 | 2/2020 |
| WO | 99/03653 A1 | 1/1999 |
| WO | 2005072917 A1 | 11/2005 |
| WO | 2007/122717 A1 | 11/2007 |
| WO | 2009045827 A2 | 4/2009 |
| WO | 20150117156 A | 8/2015 |
| WO | 2017197170 A1 | 11/2017 |
| WO | 20180133861 A1 | 7/2018 |
| WO | 2020056279 A1 | 3/2020 |
| WO | 2020056295 A1 | 3/2020 |
| WO | 2020056301 A1 | 3/2020 |
| WO | 2020056353 A1 | 3/2020 |
| WO | 2020056362 A1 | 3/2020 |
| WO | 2020056373 A1 | 3/2020 |
| WO | 2020056374 A1 | 3/2020 |
| WO | 2020056375 A1 | 3/2020 |
| WO | 2020056376 A1 | 3/2020 |
| WO | 2020056377 A1 | 3/2020 |
| WO | 2020056380 A1 | 3/2020 |

OTHER PUBLICATIONS

Blutinger, J., et al., "Scoop: Automating the Ice Cream Scooping Process", Introduction to Robotics MECE E4602, Group 8 Final Project, Dec. 2016.

Bollini, M., et al., "Interpreting and Executing Recipes with a Cooking Robot", Experimental Robotics, 2013.

Cao, Z., et al. "Realtime Multi-Person 2D Pose Estimation using Part Affinity Fields", Proceedings of the IEEE Conference on Computer Vision and Pattern Recognition. 2017.

Dantam, N.T., et al. "Incremental Task and Motion Planning" A Constraint-Based Approach, Robotics: Science and Systems 12, 00052, 2016.

Ferrer-Mestres, J., et al., "Combined Task and Motion Planning as a Classical AI Planning" arXiv preprint arXiv: 1706.06927, 2017— arxiv.org; Jun. 21, 2017.

Kaelbling, L.P, et al., "Integrated task and motion planning in belief space", The International Journal of Robotics Research; 0(0) 1-34; 2013.

Martinez, J., et al., "On human motion prediction using recurrent neural networks", Proceedings of the IEEE Conference on Computer Vision and Pattern Recognition. 2017.

Nedunuri, S., et al., "SMT-Based Synthesis of Integrated Task and Motion Plan from Plan Outlines"; the Proceedings of the 2014 IEEE Intl. Conf. on Robotics and Automation (ICRA2014).

Saxena, A., et al., "RoboBrain: Large-Scale Knowledge Engine for Robots", arXiv preprint arXiv:1412.0691 (2014).

Schenck, C., et al., "Learning Robotic Manipulation of Granular Media", 1st Conference on Robot Learning, arXiv: 1709.02833, Oct. 25, 2017.

Shimizu, T. and Kubota, T., "Advanced Sampling Scheme Based on Environmental Stiffness for a Smart Manipulator", Robot Intelligence Technology and Applications, pp. 19-208. 2012.

Srivastava, S., et al. "Combined Task and Motion Planning Through an Extensible Planner-Independent Interface Layer"; 2014 IEEE international conference on robotics and automation (ICRA), 639-646.

Stentz, A., et al., "A Robotic Excavator for Autonomous Truck Loading", In Proceedings of the IEEE/RSJ International Conference on Intelligent Robotic Systems, 1998.

Villegas, et al., Learning to Generate Long-term Future via Hierarchical Prediction, In Proceedings of the 34th International Conference on Machine Learning (ICML), 2017.

Walker, J., et al.,"The pose knows: Video forecasting by generating pose futures", In The IEEE International Conference on Computer Vision (ICCV), Oct. 2017.

Watson, J,. Kevin, et al. "Use of Voice Recognition for Control of a Robotic Welding Workcell", IEEE Control Systems Magazine; p. 16-18; (ISSN 0272-1708); 7 , Jun. 1, 1987.

Wong, J.M., et al., "SegICP-DSR: Dense Semantic Scene Reconstruction and Registration", Draper, arXiv: 1711.02216; Nov. 6, 2017.

Wong, J.M., et al., "SegICP: Integrated Deep Semantic Segmentation and Pose Estimation", Massachusetts Institute of Technology, 2017 IEEE/RSJ International Conference on Intelligent Robots and Systems (IROS); Sep. 5, 2017.

(56) References Cited

OTHER PUBLICATIONS

Wu, J., et al., "Real-Time Object Pose Estimation with Pose Interpreter Networks", IEEE/RSJ International Conference on Intelligent Robots and Systems (IROS), 2018.
Ye, G., et al., "Demonstration-Guided Motion Planning" Robotics Research. Springer Tracts in Advanced Robotics, vol. 100, 2017.
International Search Report and Written Opinion for PCT/US2019/051148 dated Dec. 12, 2019 entitled "Food-Safe, Washable, Thermally-Conductive Robot Cover".
Anonymous: "Pate a pizza fine—Notre recette avec photos—Meilleurdu Chef," Retrieved from the Internet: URL: https://www.meilleurduchef.com/fr/recette/pate-pizza-fine.html# [retrieved on Dec. 5, 2019].
International Search Report and Written Opinion for PCT/US2019/051176 dated Dec. 12, 2019 entitled "Determining How to Assemble a Meal".
International Search Report and Written Opinion for PCT/US2019/051175 dated Jan. 3, 2020 entitled Stopping Robot Motion Based on Sound Cues.
Dexai Robotics: "Alfred Sous-Chef scooping ice-cream" Youtube, retrieved from Internet Jun. 8, 2018. https://www.youtube.com/watch?v=caNG4qrZhRU.
International Search Report and Written Opinion for PCT/US2019/051179 dated Jan. 9, 2020 entitled "An Adaptor for Food-Safe, Bin-Compatible, Washable, Tool-Changer Utensils".
International Search Report and Written Opinion for PCT/US2019/051177 dated Jan. 9, 2020 entitled "Voice Modification to Robot Motion Plans".
International Search Report and Written Opinino for PCT/US2019/051183 dated Jan. 14, 2020 entitled "Locating and Attaching Interchangeable Tools In-Situ".
International Search Report and Written Opinion for PCT/US2019/051067 dated Jan. 16, 2020 entitled "Robot Interaction With Human Co-Workers".
International Search Report and Written Opinion for PCT/US2019/051161 dated Jan. 15, 2020 entitled "Food-Safe, Washable Interface for Exchanging Tools".
ATI Industrial Automation: Automatic/RoboticTool Changers, "Automatic/RoboticTool Changes", Tool Changer News. Downloaded from Internet Feb. 4, 2020. https://www.ati-ia.com/products/toolchanger/robot_tool_changer.aspx.
Dexai Robotics: "A Robot Company is Bom", retrieved from Internet from Feb. 5, 2020. https://draper.com/dexai-robotics.
Draper—"A 'Perceptive Robot' Earns Draper Spots as KUKA Innovation Award Finalist" Aug. 30, 2017, retrieved from Internet from Feb. 5, 2020. https://www.draper.com/news-releases/perceptive-robot-earns-draper-spot-kuka-innovation-award-finalist.
"Draper Spins Out Dexai Robotics", Mar. 21, 2019, retrieved from Internet from Feb. 5, 2020. https://www.draper.com/news-releases/draper-spins-out-dexai-robotics.
Dynamic Robotic Manipulation—KUKA Innovation—Finalist Spotlight—Apr. 26, 2018 retrieved from Internet Feb. 5, 2020. https://youtube.com/watch?v=7wGc-4uqOKw.
Siciliano, B., et al. "Chapter 8—Motion Control—Robotics Modelling Planning and Control", In: Robotics Modelling Planning and Control, Dec. 23, 2009.
Siciliano, B., et al. "Chapter 9—Force Control—Robotics Modelling Planning and Control", In: Robotics Modelling Planning and Control, Dec. 23, 2009.
International Search Report and Written Opinion for PCT/US2019/051040 dated Feb. 7, 2020 entitled "Manipulating Fracturable and Deformable Materials Using Articulated Manipulators".
International Search Report and Written Opinion for PCT/US2019/051180 dated Jan. 31, 2020 entitled "One-Click Robot Order".
International Search Report and Written Opinion for PCT/US2019/051061 dated Apr. 3, 2020 titled "Controlling Robot Torque and Velocity Based on Context".
Olin College of Engineering, "Autonomous Tool Changer", Draper 2016-2017, retrieved from Internet Feb. 5, 2020. http://www.olin.edu/sites/default/files/draperarchival2.pdf.
Olin College of Engineering, Autonomous Tool Changer, MoMap and the Future, "How Can We Enable a Robotic Arm to Change and Use Human Tools Autonomously", Date unknown.
Charabaruk, Nicholas; "Development of an Autonomous Omnidirectional Hazardous Material Handling Robot"; . University of Ontario Institute of Technology (Canada). ProQuest Dissertations Publishing, 2015. 10006730. (Year: 2015).
Langsfeld, Joshua D..; "Learning Task Models for Robotic Manipulation of Nonrigid Objects"; University of Maryland, College Park. ProQuest Dissertations Publishing, 2017. 10255938. (Year: 2017).
Yang et al., "Obstacle Avoidance through Deep Networks based Intermediate Perception", Apr. 27, 2017, The Robotics Instiute, Carnegie Mellon University (Year: 2017).
Feddema, John T., et al., Model-Based Visual Feedback Control for a Hand-Eye Coordinated Robotic System, Aug. 1992, IEEE, vol. 25, Issue: 8, pp. 21-31 (Year: 1992).
Rennekamp, T., et al., "Distributed Sensing and Prediction of Obstacle Motions for Mobile Robot Motion Planning," 2006, IEEE, International Conference on Intelligent Robots and Systems, pp. 4833-4838 (Year: 2006).

\* cited by examiner

MANIPULATING FRACTURABLE AND DEFORMABLE MATERIALS USING ARTICULATED MANIPULATORS

RELATED APPLICATIONS

This application claims the benefit of U.S. Provisional Application No. 62/730,703, filed on Sep. 13, 2018, U.S. Provisional Application No. 62/730,947, filed on Sep. 13, 2018, U.S. Provisional Application No. 62/730,933, filed on Sep. 13, 2018, U.S. Provisional Application No. 62/730,918, filed on Sep. 13, 2018, U.S. Provisional Application No. 62/730,934, filed on Sep. 13, 2018 and U.S. Provisional Application No. 62/731,398, filed on Sep. 14, 2018. The entire teachings of the above applications are incorporated herein by reference.

This application is related to U.S. patent application Ser. No. 16/570,855, U.S. patent application Ser. No. 16/570,955, U.S. patent application Ser. No. 16/571,003, U.S. patent application Ser. No. 16/570,915, U.S. patent application Ser. No. 16/570,976, U.S. patent application Ser. No. 16/570,736, U.S. patent application Ser. No. 16/571,025, U.S. patent application Ser. No. 16/570,606, U.S. patent application Ser. No. 16/571,040, and U.S. patent application Ser. No. 16/571,041, all filed on the same day, Sep. 13, 2019.

The entire teachings of the above applications are incorporated herein by reference.

BACKGROUND

Traditionally, the food industry employs human labor to manipulate ingredients with the purpose of either assembling a meal such as a salad or a bowl, or packing a box of ingredients such as those used in grocery shopping, or preparing the raw ingredients. Robots have not yet been able to assemble complete meals from prepared ingredients in a food-service setting such as a restaurant, largely because the ingredients are arranged unpredictably and change shape in difficult-to-predict ways rendering traditional methods to move material ineffective without extensive modifications to existing kitchens. Additionally, traditional material handling methods are ill-suited to moving cooked foods without altering their texture and taste-profile. These difficulties arise because the friction, stiction, and viscosity of commonly consumed foods cause auger, conveyor, and suction mechanisms to become clogged and soiled, while these mechanisms simultaneously impart forces on the foodstuffs which alter their texture, consistency, and taste-profile in unappetizing ways.

SUMMARY

Autonomous manipulation of objects and materials in unstructured environments is an unsolved problem in robotics. Substantial progress has been made in grasping a priori unknown rigid objects and placing them in a specific location (e.g. "pick and place"). However, materials that deform during manipulation, or require fracturing or breaking to separate a piece to manipulate, are substantially more difficult to manipulate. A successful pick and place operation of an un-occluded object, typically requires one, challenging and expensive computation, which is to find the configuration that satisfies a set of constraints enabling the robot to firmly grasp the object. However, successfully picking or scooping a given quantity of a deformable material from a container also requires additional set of constraints such as separating a desired quantity of material from the bulk, and keeping the object from falling out while in transition, which then necessitates finding an entire trajectory that satisfies a set of constraints. The need for the entire trajectory to satisfy certain constraints makes the problem of manipulating deformable material significantly more difficult.

Deformable and fracturable materials are commonly encountered in food & beverage industry, construction, and manufacturing. Example materials include granular materials (grains, croutons, corn kernels, soil, snow, construction debris, leafy greens, etc.), soft solid materials (ice cream, butter, guacamole, mashed potatoes, etc.), collections (cubed chicken, steamed carrots, green beans, sliced cucumbers, cherry tomatoes, etc.), and deformable items (tomatoes, peppers, chicken breasts, hamburgers, etc.), etc. These materials are grouped into classes, which may contain seemingly unrelated materials, having similar viscosities, moisture content, angles of repose, fracture toughness, stiffness, and friction coefficients. In this manner, the materials can be manipulated using common strategies. For example, sour cream and guacamole share similar properties (e.g., viscosity, stiffness, fracture toughness, temperature dependence), and similarly for the materials butter and ice cream.

As almost all foods fall into the class of deformable or fracturable materials, this disclosure focuses on the food manipulation applications of this generic approach to manipulating fracturable and deformable materials. However, these techniques are not restricted to food service and can be applied to other industries and activities such as excavation, construction, surgical tissue removal, and sculpture.

In embodiments, the below disclosure solves problems in relation to employing robotics in a foodservice environment, but the general approach is applicable to manipulating any material that deforms, fractures, or separates (in the case of a granular collection, such as sand, grains, or salad greens) during manipulation.

In an embodiment, a method generates a representation of a collection of materials within a container based on sensor systems including at least one of a camera, stereo vision system, depth sensor, lidar, or radar, wherein the representation can include one or more of size, shape, orientation, material type, and condition. The sensor systems can also include a thermal imager, infrared (IR) imager/camera, ultraviolet imager/camera (IR), and depth sensors including a structured light camera, time-of-flight camera, lidar, a 3D laser scanner, a 2D laser scanner, radar, or stereo vision. A person having ordinary skill in the art can recognize a depth sensor is a sensor that outputs an RGB image accompanied by a depth dimension, such as a Microsoft Kinect®, or Intel RealSense®.

The method further includes determining a set of trajectories to collect a given amount or quantity (e.g., a mass, volume, or number of discrete objects) of a material from the collection of materials within the container based on the volume of intersection. The volume of intersection is computed by calculating the intersection of the geometry of the utensil with the material at a series of points along the trajectory. This can also be done continuously by integrating the entry surface of the utensil along the trajectory. By discretizing the material into a series of volume elements, the force of the utensil, external forces such as gravity, and friction forces and viscous forces from nearby material can be used to determine the motion of that volume element. The volume captured by the utensil is determined by the volume elements which remain in the utensil at the end of the trajectory. This calculation can also be performed in a continuous manner by letting the volume element size become infinitesimally small.

Instead of using a direct calculation of the captured volume by the utensil, an estimate of the captured volume from the intersection between a utensil and the material volume and the physical reaction of the material can be used. This estimate can be formed by a neural network, or another arbitrary function approximator, which is trained to compute the captured volume by using gradient descent and a loss function to predict the amount of removed material from a large number of examples of removed material.

The method further includes marking a subset of the set of trajectories as meeting at least one physical constraint or at least one practical constraint. The method further includes ranking the subset of the set of trajectories based on at least one criteria, selecting the highest-ranking trajectory, and sending the highest-ranking trajectory to a robotic arm as a motion plan for execution. Selection can be based on a number of criteria, or in another embodiment at random. Example physical constraints are ensuring that the utensil does not collide with any of the geometry in the environment of the robot, or if the utensil does collide, then the total contact force is limited below some threshold.

The motion plan can be open-loop (e.g., without any further supervision), or closed-loop where the end-effector trajectory or robot arm joint-space trajectory (e.g., position, velocity, acceleration, or jerk), or applied joint torque, or force/torque at the end-effector is changed during execution based on input from at least one sensor (e.g., robot joint encoder, camera or depth sensor as above, robot joint torque, other force or torque measurement (e.g., a scale that the material is resting on), or measurement of the robot's motion (e.g. a VICON or other external measurement system). Closed-loop modifications are made to adjust the volume of material contained in the utensil during the executed trajectory. The amount of material in the utensil may be measured by a vision system, robot arm joint_torque, or a utensil mounted force/torque sensor. The trajectory modification may be made to increase the predicted captured volume by changing the current trajectory to a different trajectory which is predicted to have a larger capture volume. The different trajectory may be chosen to be the closest trajectory (using a Euclidean or other distance metric) with a larger predicted capture volume, or a randomly chosen trajectory with a larger captured volume which is within some distance of the current trajectory. An additional heuristic of scoring metric may be used to choose the trajectory with a different capture volume. Additionally, the trajectory may be modified to reduce the capture volume.

In an embodiment, a method includes determining a set of trajectories that collect an amount of material from a collection of materials by employing a generated representation of the collection of material based on a volume of intersection or an estimate of the volume of the intersection between an end-effector and the material volume, and based on at least one physical reaction of the material with the end-effector. The representation can be a surface of the material, a point cloud, object locations, sizes, shapes, orientations, material type, condition of the material, or a depth image. The amount of material can be a given mass, volume, or quantity of material. The method further includes selecting a given trajectory of the trajectories based on at least one criterion. The method further includes sending the given trajectory to a machine configured to move the end effector, which causes the machine to execute the trajectory.

In addition to the volume of intersection, the material can react to the end-effector. Such a physical reaction of the material to the end-effector affects the determined set of trajectories. Therefore, the trajectories should be selected based on a physical reaction to the end-effector in addition to intersection volume, so that the material is actually captured by the utensil instead of spilled, pushed out of the path of the utensil, damaged, smashed, or otherwise damaged.

In an embodiment, executing the trajectory includes moving the end-effector or components of the machine within a threshold of the given trajectory. It is possible to move the end-effector along a same trajectory while the components of the machine (e.g., robotic arm) follows a different trajectory. In other words, the end-effector can follow the same path while the rest of the machine components move differently, or vice-versa.

In an embodiment, the method can determine the trajectories by determining a trajectory free from collision with an object in an environment based on at least one of the following: a physical model of the environment, and output from one or more of the sensor systems. Such a determination can be made in real time or prior to execution.

In an embodiment, selecting the given trajectory includes employing a criterion based on one or more of: execution time, intersection volume, physical reaction of the material with the end-effector, proximity to collision with other objects, proximity to hardware physical constraints including at least one of joint limits, acceleration limits, velocity limits, and jerk limits, path length, required torque, required energy or effort, and additional computational effort. Physical reactions of the material with the end-effector can include: spillage, a compressive/compression force (e.g., smashing), torque exerted on the material, tensile force (e.g., pulling), cutting, and amount of material captured in the end effector.

In an embodiment, the method can include determining an end-effector trajectory, a joint position, or a joint torque based on an estimated property of the material. The property can include stiffness, viscosity, viscoelasticity, fracture toughness, material density, serving mass, serving volume, friction coefficient, or material grain size. In other words, when the material is stiffer, the joint torque may increase, etc.

In an embodiment, selecting the given trajectory further includes choosing the given trajectory based on the criterion having a numerical score. The numerical score can be a shortest joint-space distance, a shortest end-effector distance, minimum energy, smallest maximum torque, shortest time, the amount of material, or largest clearance between obstacles.

In an embodiment, the method further includes, during execution of the given trajectory, compensating for errors in trajectory tracking based on:

a) tracked position, tracked velocity, and tracked acceleration of at least one actuator of the robotic arm. The trajectory, the tracked velocity, and the tracked acceleration are of at least one portion of the robot or a frame of the robot arm that can be transformed to one or more of the tracked position, tracked velocity, and tracked acceleration, b) measured or inferred force or torque on at least one joint of the robotic arm, on an end effector of the robot arm, or on a frame of the robot arm that can be transformed to measured or inferred torque; or c) maintaining at least one criterion, including one or more of a volume of material intersection and physical reaction of the material.

In an embodiment, the method includes determining the amount of material to be collected based on one or more of:
a) direct computation of an intersection volume of an end-effector coupled with the machine for the given trajectory with the collection of materials and the physical reaction to the end-effector,
b) an approximation of at least one of the volume and mass of the captured material established by a neural network or statistical model, or
c) a heuristic function providing the amount of material to be collected by the end-effector for the given trajectory.

In an embodiment, selecting the given trajectory further includes determining the amount of material to be collected in the end-effector by at least one of the trajectories in the set of trajectories and selecting based on the amount of material to be collected, or generating the trajectory by employing a generation function based on the amount of material to be collected.

In an embodiment, the method further includes determining a trajectory generation function by at least one of: an approximation function, adversarial training, adversarial training including using a generative adversarial network (GAN), or reinforcement learning. The approximation function can be generated by a neural network.

In an embodiment, the method further includes estimating a path of dispersing of the collected material into a predefined configuration and location using a physics-based model based on an estimated viscosity, a viscoelasticity, a serving mass, a serving volume, a fracture toughness, or a density.

In an embodiment, the method further includes determining a destination for material collected by the robotic arm, and a destination configuration for the material collected. The destination configuration can be represented as a desired density distribution, voxel representation of the material, material surface, or a probability distribution of any of the prior representations.

In an embodiment, the method further includes determining, as part of the trajectory, removing the material from the end effector of the robotic arm. The trajectory which removes material from the end-effector can be chosen to provide the highest probability of creating the desired destination configuration of the material. For each trajectory, the final configuration of the material can be determined by using the same method as described above by discretizing the material into a set of volume elements and computing the forces acting on the material. This estimate of the final configuration for each trajectory can be estimated using an approximation to this physics based model which is created by training a neural network on real examples of trajectories which deposit material from an end-effector into a container. By training the network to predict a future density, volume, or surface distribution of the material, this can be used to judge existing trajectories and choose the trajectory which is closest to the desired final configuration of the material.

In an embodiment, the method further includes creating a torque or effort profile for given material characteristics based on one or more of a tool geometry, an intersection profile with the material, non-linear effects of velocity and acceleration, and acceleration dependent forces.

In an embodiment, the method further includes adjusting, by at least one closed loop controller, a position, a velocity, an acceleration, or a torque of at least one actuator of the robotic arm, based on a camera, depth sensor input, robot position, or a torque sensor, causing the amount of collected material to be within a threshold of a goal amount. The method further includes employing an estimator to determine an intermediate system representation based on the sensor data, and determine a control output based on the intermediate system representation. The method further includes choosing an active controller from a set of closed loop controller based on which best matches the current conditions based on a quality metric. Each of the closed loop controllers can be configured to employ a set of operation conditions. Each of the closed loop controllers can be configured to be a neural network trained based on collected data or simulated data. The neural network can be adversarially trained. Each of the at least one closed loop controllers can be tuned by reinforcement learning or optimization based on experiments.

In an embodiment, a system includes a processor and a memory with computer code instructions stored thereon. The processor and the memory, with the computer code instructions, can configured to cause the system to determine a set of trajectories that collect an amount of material from a collection of materials by employing a generated representation of the collection of material based on a volume of intersection or an estimate of the volume of the intersection between an end-effector and the material volume, and based on at least one physical reaction of the material with the end-effector. The representation can include a surface of the material, a point cloud, object locations, sizes, shapes, orientations, material type, condition of the material, or a depth image. The amount of material can be a given mass, volume, or quantity of material. The computer code instructions can further cause the system to select a given trajectory of the trajectories based on at least one criterion. The computer code instructions can further cause the system to send the given trajectory to a machine configured to move the end effector, causing the machine to execute the trajectory.

In an embodiment, the system can be implemented by a field programmable gate array (FPGA) or application-specific integrated circuit (ASIC) in place of or in conjunction with a processor or memory.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

Operating a robot in a food preparation environment, such as a quick service restaurant, can be challenging for several reasons. First, the end effectors (e.g., utensils), that the robot uses need to remain clean from contamination. Contamination can include allergens (e.g., peanuts), dietary preferences (e.g., contamination from pork for a vegetarian or kosher customer), dirt/bacteria/viruses, or other non-ingestible materials (e.g., oil, plastic, or particles from the robot itself). Second, the robot should be operated within its design specifications, and not exposed to excessive temperatures or incompatible liquids, without sacrificing cleanliness. Third, the robot should be able to manipulate food stuffs, which are often fracturable and deformable materials, and further the robot must be able to measure an amount of material controlled by its utensil in order to dispense specific portions. Fourth, the robot should be able to automatically and seamlessly switch utensils (e.g., switch between a ladle and salad tongs). Fifth, the utensils should be adapted to be left in an assigned food container and interchanged with the robot as needed, in situ. Sixth, the interchangeable parts (e.g., utensils) should be washable and dishwasher safe. Seventh, the robot should be able to autonomously generate a task plan and motion plan(s) to assemble all ingredients in a recipe, and execute that plan. Eighth, the robot should be able to modify or stop a motion plan based on detected interference or voice commands to stop or modify the robot's plan. Ninth, the robot should be able to minimize the applied torque based on safety requirements or the task context or the task parameters (e.g., density and viscosity) of the material to be gathered. Tenth, the system should be able to receive an electronic order from a user, assemble the meal for the user, and place the meal for the user in a designated area for pickup automatically with minimal human involvement.

Figure 1:
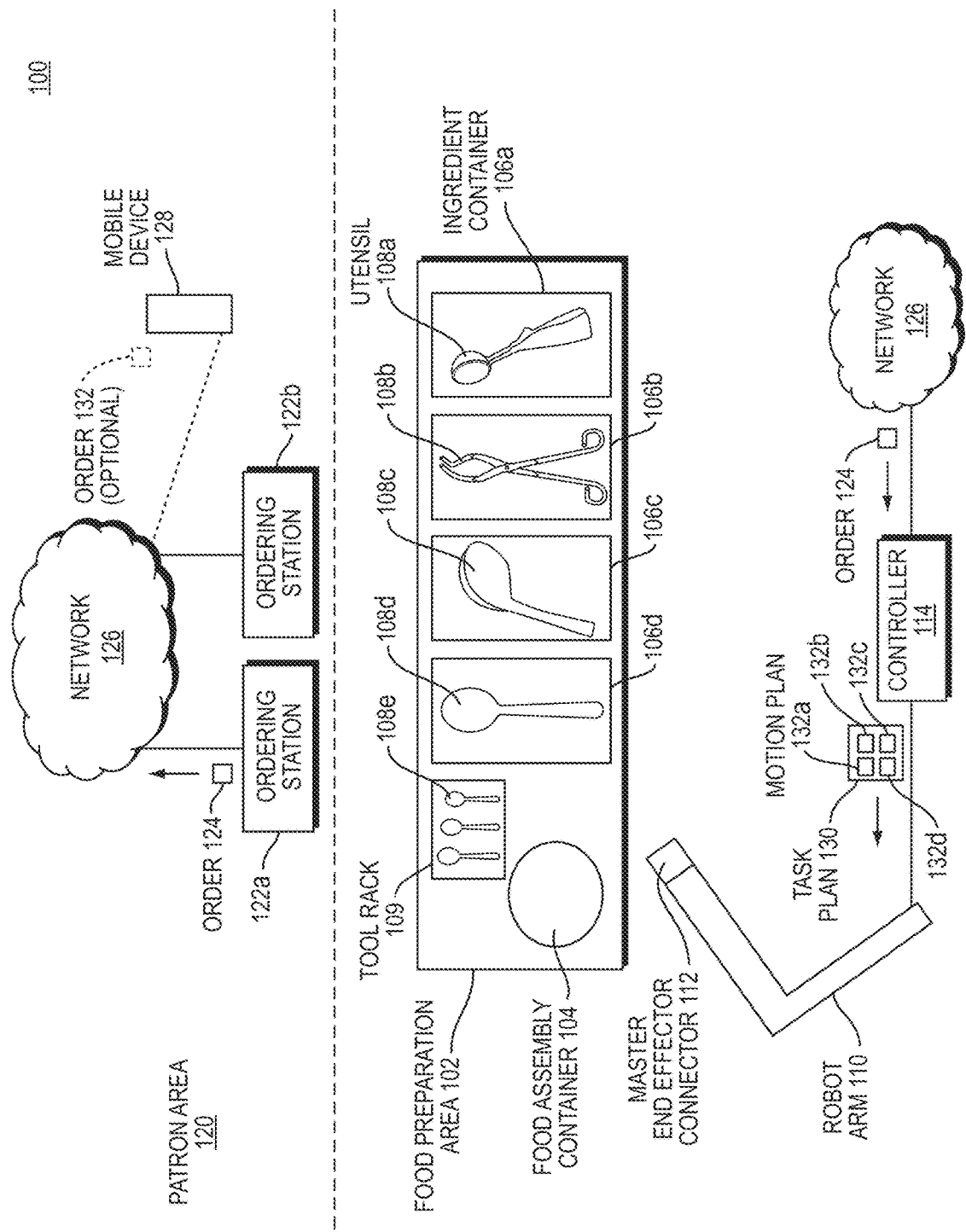
FIG. 1 is a block diagram illustrating an example embodiment of a quick service food environment of embodiments of the present disclosure.

FIG. 1 is a block diagram illustrating an example embodiment of a quick service food environment 100 of embodiments of the present disclosure. The quick service food environment 100 includes a food preparation area 102 and a patron area 120.

The food preparation area 102 includes a plurality of ingredient containers 106*a-d* each having a particular foodstuff (e.g., lettuce, chicken, cheese, tortilla chips, guacamole, beans, rice, various sauces or dressings, etc.). Each ingredient container 106*a-d* stores in situ its corresponding ingredients. Utensils 108*a-d* may be stored in situ in the ingredient containers or in a stand-alone tool rack 109. The utensils 108*a-d* can be spoons, ladles, tongs, dishers (scoopers), spatulas, or other utensils. Each utensil 108*a-e* is configured to mate with and disconnect from a tool changer interface 112 of a robot arm 110. While the term utensil is used throughout this application, a person having ordinary skill in the art can recognize that the principles described in relation to utensils can apply in general to end effectors in other contexts (e.g., end effectors for moving fracturable or deformable materials in construction with an excavator or backhoe, etc.); and a robot arm can be replaced with any computer controlled actuatable system which can interact with its environment to manipulate a deformable material. The robot arm 110 includes sensor elements/modules such as stereo vision systems (SVS), 3D vision sensors (e.g., Microsoft Kinect™ or an Intel RealSense™), LIDAR sensors, audio sensors (e.g., microphones), inertial sensors (e.g., internal motion unit (IMU), torque sensor, weight sensor, etc.) for sensing aspects of the environment, including pose (i.e., X, Y, Z coordinates and roll, pitch, and yaw angles) of tools for the robot to mate, shape and volume of foodstuffs in ingredient containers, shape and volume of foodstuffs deposited into food assembly container, moving or static obstacles in the environment, etc.

To initiate an order, a patron in the patron area 120 enters an order 124 in an ordering station 122*a-b*, which is forwarded to a network 126. Alternatively, a patron on a mobile device 128 can, within or outside of the patron area 120, generate an optional order 132. Regardless of the source of the order, the network 126 forwards the order to a controller 114 of the robot arm 110. The controller generates a task plan 130 for the robot arm 110 to execute.

The task plan 130 includes a list of motion plans 132*a-d* for the robot arm 110 to execute. Each motion plan 132*a-d* is a plan for the robot arm 110 to engage with a respective utensil 108*a-e*, gather ingredients from the respective ingredient container 106*a-d*, and empty the utensil 108*a-e* in an appropriate location of a food assembly container 104 for the patron, which can be a plate, bowl, or other container. The robot arm 110 then returns the utensil 108*a-e* to its respective ingredient container 106*a-d*, the tool rack 109, or other location as determined by the task plan 130 or motion plan 132*a-d*, and releases the utensil 108*a-d*. The robot arm executes each motion plan 132*a-d* in a specified order, causing the food to be assembled within the food assembly container 104 in a planned and aesthetic manner.

Within the above environment, various of the above described problems can be solved. The environment 100 illustrated by FIG. 1 can improve food service to patrons by assembling meals faster, more accurately, and more sanitarily than a human can assemble a meal. Some of the problems described above can be solved in accordance with the disclosure below.

Deformable, granular and fracturable materials are challenging for autonomous systems to manipulate. Examples of such problems include using autonomous systems/tools to:

a) excavate a ditch using a backhoe,
b) shovel sand, snow or dirt
c) clear debris using a bulldozer, and
d) manipulating foodstuffs, such as scooping ice cream, spooning guacamole, using tongs to pick up noodles, etc.

Applicant's approach described in detail below enables a robot to autonomously select and remove a specific amount (e.g., mass or volume) of a given material from a collection of that material, while accounting for how the material changes (e.g., movement) during and after the manipulation of the collected materials and removal of the given materials. For example, outside of the foodstuff environment, when shoveling from a pile of sand, the shape of the sand pile changes as the shoveling occurs, and adjustment to the motion during excavation can be needed. Similarly, a collection of foodstuffs can change during scooping/spooning/manipulating with tongs. For example, while spooning guacamole, the initial shape of the collection of guacamole may change as the spoon scoops the guacamole—humans commonly account for this motion by modifying the trajectory of the utensil and using auxiliary constraints (such as the walls of the container or another utensil). Therefore, a system is needed to account for the movement of the collection of materials during collection. The above method which uses a set of trajectories, where the behavior of the material can be predicted for each trajectory, and a certain trajectory can be chosen based on a criterion, allows accurate and effective manipulation of this class of materials.

Before each scooping or picking operation, the shape of material is different due to changes that occurred during previous manipulations of that material. To solve this problem, Applicant's system and method senses the surface of the material using a structured light depth camera, or another sensor which can determine the material surface (e.g. radar, lidar, stereo vision, or RGB camera from which depth is inferred) before manipulating the material. The surface distribution can be approximated from the raw data using a variety of averaging and median techniques and represented as an estimated surface profile. Neural networks and other image processing techniques can also be used to fit the raw data to an expected model of the material, further improving the estimation of the material location in the container.

Based on the resulting estimated material surface profile, the system calculates potential trajectories of the end effector or utensil that obey a set of constraints. In an embodiment, a trajectory is a time-ordered sequence of joint angles (e.g., positions). The trajectory encompasses linear actuator positions (e.g., excavator, or CNC milling machine) as well as rotational (e.g., robot arm). The system calculates an intersected volume of each potential trajectory and predicts the quantity of material which will be captured in the end-effector by accounting for the forces present on the material during manipulation. The system selects trajectories that satisfy the set of constraints and have a collected volume matching the needed amount of collected material within a specified tolerance. Examples of constraints include:

a) Being collision free (e.g., no part of the robot or the utensil penetrates the container or other static or moving obstacles in the area). Obstacle location can be determined by various means.

b) The utensil trajectory captures and shears the targeted material to be extracted, separating it from the bulk according to the viscosity, fracture toughness, friction, and stiffness characteristics of the material.

c) The material remains in the utensil during motion (e.g., accounts for gravity, utensil forces, friction, viscous effects). This can be constrained by simulating or estimating the dynamic response of the captured material during motion.

d) Kinematically feasible, given robot joint limits.

e) Cutting surface of the utensil is normal, within a range of angles, to the direction of motion in the material.

f) Satisfying robot torque limits and end effector/utensil force and torque limits.

Satisfying these constraints requires knowledge of the robot, material properties, container geometry, and utensil geometry. By satisfying these constraints, the disclosed system and method improves the robustness of a utensil/robot trajectory that only accounts for the position of the utensil, by including estimations of the viscosity/fracture toughness of the material to be manipulated, which accounts for the anticipated change in the material as it is being manipulated. By accounting for at least one external force on the material, and using a physical model (or an approximate model which is trained on realistic data), better actions can be chosen for manipulating deformable and fracturable materials.

Once the set of potential trajectories that intersect the surface of the material and satisfy all constraints is generated, the method selects possible trajectories to execute based on the following criteria:

a) Trajectory intersects a non-zero volume. Volume can be computed directly by integrating the utensil cross-section over the trajectory, or can be approximated by using a heuristic based on the depth of the utensil (or points relative to the utensil) below the surface of the material.

b) Trajectory maintains the utensil to be oriented with the cutting surface normal to the material surface, within some angle range, while it is within some range of the surface of material.

c) Amount of material (e.g., volume or mass) to be removed. Ideally, the system does not want to gather too much or too little material during a scoop because it may plunge the utensil deeper than necessary, or so shallow that it gathers little to no material. The desired quantity of material remains in the utensil after the action and external forces which act on the material during the action, including gravity, friction, and utensil force, must be accounted for.

d) The method can also account for losses based on viscosity and static friction of the material (e.g., lower viscosity materials may be more likely to spill, while higher static friction materials are less likely to spill).

At this point, a set of remaining possible trajectories are available to the system. The system then chooses a particular trajectory to execute based on one or more of the following criteria: (a) a metric related to volume (most, least, median, etc.), (b) scoop depth relative to the surface (deepest, shallowest, median, etc.), (c) scoop location relative to the highest (lowest, median) material point, (d) randomly, or (e) a weighted combination of the above.

After executing the manipulation, the system can compare the amount of material collected with the expected volume or mass from an overlap integral calculation. Trajectories can be run open-loop or closed-loop, in position or torque control. Better results are expected in closed-loop torque control. In embodiments, the method can monitor how well the robot tracks the desired trajectory and modifies the trajectory to better model the material hardness. The system may also monitor the quantity of the material contained in the utensil and modify the chosen trajectory during execution to increase or decrease the predicted captured material to compensate for errors in the material surface height measurement.

In other embodiments, the above described method can apply machine learning techniques to improve the trajectory selection process. For example, a model or neural net can learn from results of executed trajectories which trajectories are likely to succeed or fail in the future. This learning/model can be applied as a weight in the above calculation in choosing an appropriate trajectory.

Applicant's system employs a sensing apparatus or suite of sensors including at least one of a stereo vision systems (SVS), 3D vision sensors (e.g., Microsoft Kinect™ or Intel RealSense™), LIDAR sensors, audio sensors (e.g., microphones), inertial sensors (e.g., internal motion unit (IMU), torque sensor, weight sensor, etc.). In addition, Applicant's system includes an articulated robot arm, an end effector which is able to manipulate the chosen material (e.g., a utensil such as a spoon, shovel, or excavator), and torque sensor(s) in the arm of the robot.

The depth camera (or appropriate sensor or system measuring material height/orientation) determines the current state of the environment (e.g., estimate of obstacle and material locations) for the scooping controller. The scooping controller computes a trajectory which results in extraction of the desired material. The robot executes the calculated and selected trajectory. As the robot executes, the scooping controller monitors and corrects the trajectory as it is executed (e.g., closed loop behavior), or evaluates the result of the scooping at the end of the trajectory (e.g., open loop behavior). The evaluation includes a metric of how well the robot tracks the desired trajectory (e.g., position of the robot and applied torque over time), a metric of how the utensil traverses the material (e.g., depth below the surface of the material), a metric of how much material is captured by the utensil, and a metric of how much material is deposited in the target location.

The torque sensor can be used to determine how much material the robot has collected in its utensil as it collects material from the container. The torque sensor can also be used to measure the applied torque to determine if it is above a determined minimum amount of torque and below a determined maximum amount of torque.

In addition, the vision systems can determine the pose and quantity (e.g., volume or mass) of the material in the utensil.

Other systems can remove or transport materials, but have shortcomings compared to the present disclosure. For example, if the collection of material does not substantially change during manipulation, then simple, open-loop trajectories are possible. However, these systems are not able to adjust or correct trajectories as the collection of materials changes. For instance, computer numerical control (CNC) machine tools remove material in specified patterns assuming that the resulting shape remains fixed. A CNC tool path does not account for changes in the raw material shape as it is executing, and this can result in the CNC machine tool running trajectories which do not intersect the material or taking too large a cut if the material shape is different than during the initial program.

On the two extremes of material deformity/viscosity (of solids and liquids, respectively), extraction of materials is much more predictable. For example, the behavior of metal, a material that is not deformable, is well known during cutting and extraction. Similarly, if the material is vastly deformable (e.g., a liquid) then the material maintains the shape of its container after manipulation and again simple open loop trajectories are possible. However, for materials that are in between (e.g., ice cream, guacamole, salsa, sour cream, lettuce, snow, soil, sand), the motion plan needs to account for the complex behavior of the material during manipulation, by creating motion plans that account for the meaningful forces acting on the material, and their effects on the pose of the material.

To transport granular materials, some current solutions include conveyors, blowers, vibrating tables, etc. Similarly, solutions exist for moving viscous materials such as mixers, extruders, etc. Many solutions use bins, chutes, funnels and rely on gravity to move the material from one belt to another. However, none of these solutions use a mechanical arm to move a specific amount of material from a collection of materials that can have varying degrees of viscosity or other material properties. These systems can also have undesirable effects on the consistency and state of the transported material, making it unsuitable for use in food preparation. Additionally, these systems can introduce contaminants to the material being manipulated, reducing their desirability in food service settings.

Other solutions attempt to scoop material using utensils, but these solutions are not robust or do not generalize. Google Brain™ attempts to use a pure neural net instead of the present disclosure's model based approach. The present disclosure uses a mathematical deterministic model of the kinematics of the robot with no learning required for calculating the path. While the present disclosure can combine this deterministic model with a neural network, Google Brain's™ solution only uses a neural net, and does not use a deterministic model.

KTH discloses a solution that performs a trench run that follows the surface. However, the present disclosure explores all possible paths, which can include scoops that are deeper than just the surface, for example.

Carnegie Mellon University disclosed an autonomous backhoe for excavation, which repeats a specific motion until there was a hole. Such a solution is different from Applicant's disclosure because Applicant plans several trajectories depending on the environment, instead of repeating the same motion.

Presently, in the food service environment, manual labor is predominantly used instead of robot labor.

Figure 2:
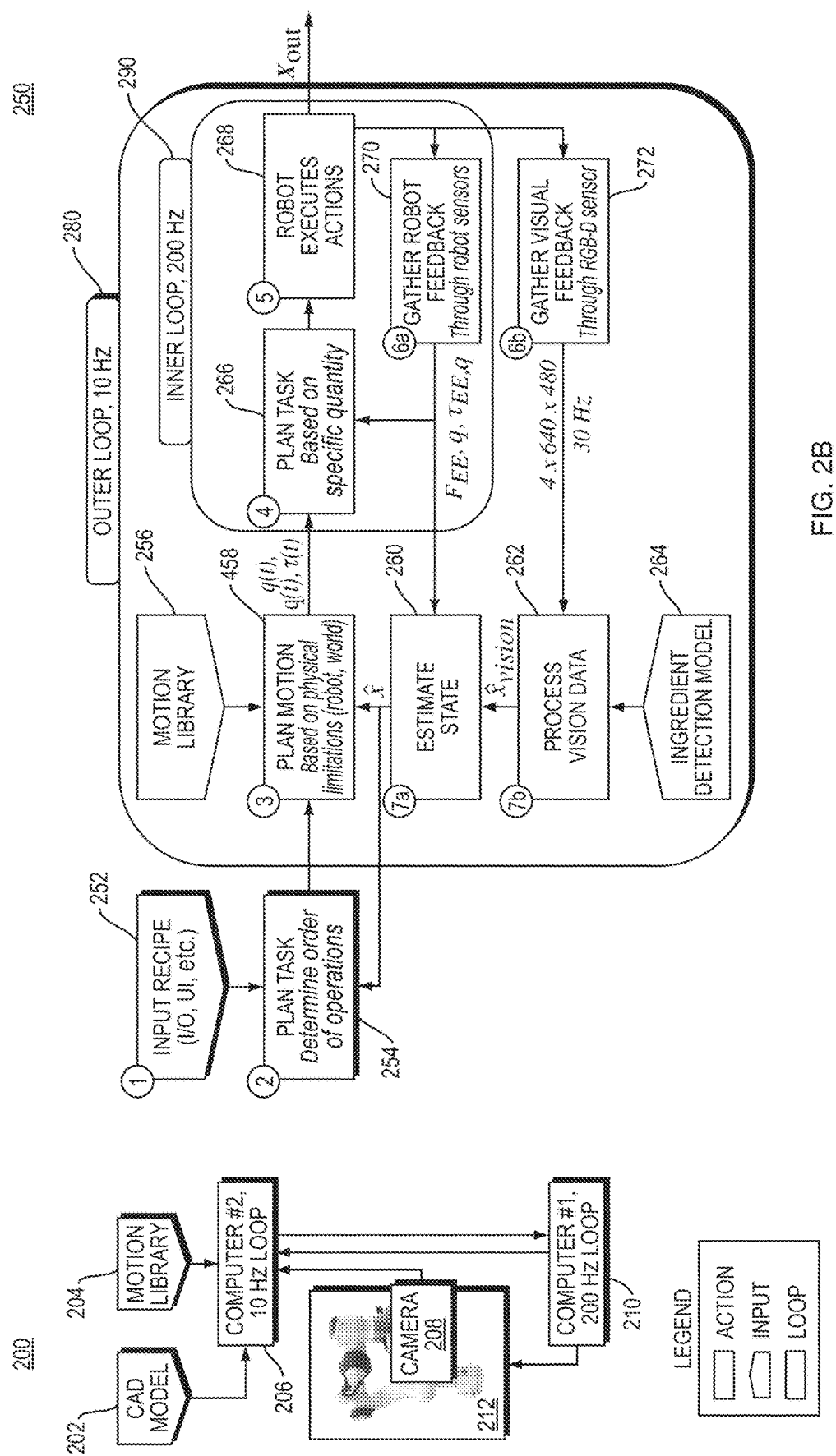
FIG. 2A is a high-level diagram illustrating an example embodiment of the present disclosure.
FIG. 2B is a block diagram illustrating an example embodiment of a method for manipulating and removing fracturable and deformable materials.

FIG. 2A is a high-level diagram 200 illustrating an example embodiment of a method for manipulating and removing fracturable and deformable materials. Various planners (task planner, motion planners), sensors (robot sensors, RGB-D sensor), interfaces (robot/world interface), and other modules and inputs are interfaced to output motion to a robot to execute a recipe or motion/task plan as part of executing a recipe.

The block diagram 200 illustrates a method to extract a specified quantity (e.g., mass, volume, or number of discrete pieces) of a deformable material from a container. A recipe, which details the goal state, is provided to a task planner. The goal state, for example a Caesar salad, is interpreted as a geometric arrangement of ingredients (e.g., lettuce, chicken, croutons, cheese, and dressing) that satisfies certain properties (e.g., distribution of material does not extend beyond the container, all materials are evenly distributed). Given this geometric goal state, the task planner assigns a set of tasks to be executed to achieve that state. For each task, which is typically fetching an ingredient, a set of actions (e.g., typically get and attach the appropriate end effector to the robot, scoop, slice, pick, or shovel the appropriate amount of material, deposit in the goal container, and detach the end effector) are executed to collect a specified amount of material from the container and deposit it in the container at the sub goal location. Prior to execution of each of these actions, a motion planner creates a feasible trajectory which would accomplish that action. This trajectory ($q(t)$, $\dot{q}(t)$, and $\tau(t)$) is executed by the plan_runner, and the execution is continuously monitored by the perception system at two rates. The 'inner loop,' which operates at greater than 200 Hz in one embodiment, monitors how well the robot is tracking the assigned trajectory by monitoring position and torque sensors on the robot joints. The 'outer loop' uses slower vision and depth sensors, and operates at 30 Hz in one embodiment. The 'outer loop' adjusts the trajectory based on changes in the environment due to the actions of the robot or external actors. This process is repeated for each action in each task until the goal state is achieved.

An outer loop 206 processes a CAD model 202 of the environment, a motion library 204 of available motions for a robot, and a camera input 208 observing the environment of the robot 212. Meanwhile, an inner loop 210 receives and sends feedback information to and from the outer loop, and sends action to the robot 212 to execute.

FIG. 2B is a diagram 250 illustrating an example embodiment of the present disclosure. FIG. 2B illustrates elements similar to the diagram 200 of FIG. 2A in further detail. In relation to diagram 250 of FIG. 2B, a plan task 254 is determined based on an input recipe 252. The input recipe 252 can be loaded from a database, selected by a user order, selected by user input, or selected in a user interface, for example. The input recipe 252 can further be a custom recipe. The plan task 254 can further be an order of operations for creating the meal of the input recipe 252.

An outer loop 280 receives the plan task 254 and determines a planned motion 258 based on motions available in a motion library 256. The plan motion 258 are based on physical limitations of the robot being employed and real-world limitations. The plan motion 258 is further sent to an inner loop 290. The plan motion 258 can be in the form of a trajectory q(t), q̇(t), and τ(t), as described above. The inner loop 290 performs processing, as described in further detail below, provides instructions to a robot for executing an action ($X_{out}$) 268, outputs feedback of the robot action through robot sensors ($F_{EE}$, q, and $\tau_{EE,q}$) 270 back to the outer loop 280.

The inner loop further processes vision data 262 based on an ingredient detection model 264 and gathers visual feedback 272 through an RGB depth sensor of the environment. The RGB-depth data is at a resolution of 4×640×480 and is sampled at 30 Hz, in one embodiment. The processed vision data is outputted as $\hat{x}_{vision}$ and is used to estimate a state of the environment 260. The state is estimated 260 based on $\hat{x}_{vision}$ and the feedback of the robot action through robot sensors ($F_{EE}$, q, and $\tau_{EE,q}$) 270. The estimated state is outputted as $\hat{x}$ and provided as feedback to determine a plan motion 258. The next plan motion 258 is determined by accessing the plan task 254, the motion library 256, and the estimated state, $\hat{x}$.

The outer loop 280 runs at a slower speed/frequency than the inner loop 290. In an embodiment, the outer loop 280 runs at 10 Hz and the Inner Loop runs at 200 Hz. A person having ordinary skill in the art can recognize that the outer loop 280 and inner loop 290 can run at different frequencies, but that the outer loop 280 runs at a lower frequency than the inner loop 290. The outer loop 280 runs at a lower frequency because it performs the higher-level operation of generating a plan motion 258, while the inner loop determines a plan task 266 and manages the robot executing its actions 268 while gathering robot feedback 270 in real time. However, both loops run simultaneously while exchanging feedback, which ultimately enhances the executed actions of the robot ($X_{out}$).

Figure 3:
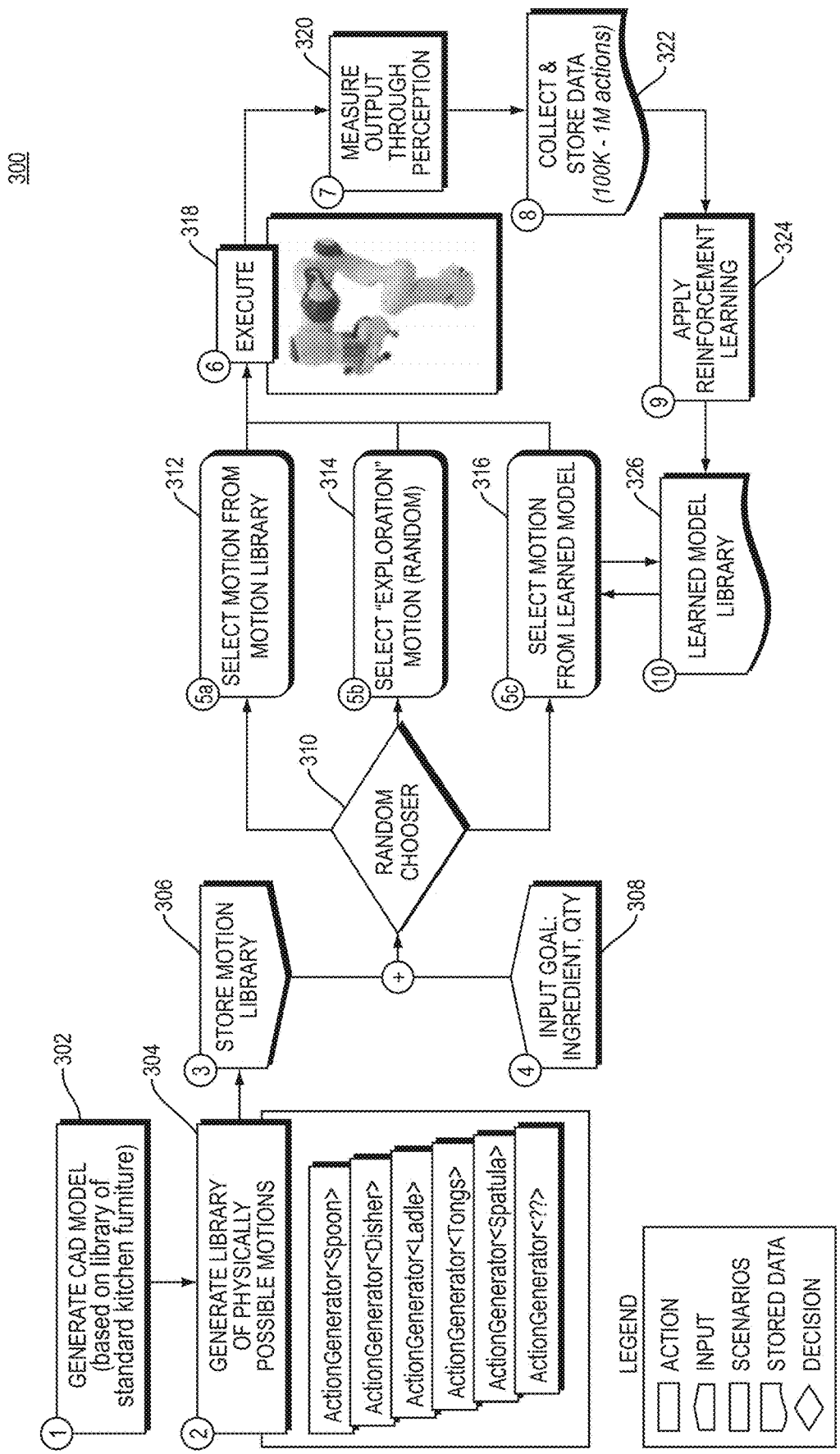
FIG. 3 is a flow diagram illustrating an example process of machine learning employed by the present disclosure.

FIG. 3 is a flow diagram 300 illustrating an example process of machine learning employed by the present disclosure. While FIG. 3 describes the process in relation to a food service environment, a person having ordinary skill in the art can recognize other environments, such as construction, are possible. The following description is not limited to a food service environment (e.g., a kitchen, etc.).

To initiate the process, the system generates a CAD model of the environment (e.g., the environment illustrated in FIG. 1) based on a library of standard kitchen furniture (302). In other embodiments, a person having ordinary skill in the art can recognize that the library can be of other objects including other types of furniture or objects, such as items seen in a construction context (e.g., rebar, construction machinery, raw materials, etc.). Based on the generated CAD model (302), the process generates a library of physically possible motions for a robotic system (e.g., a robotic arm) (304). The library of motions relates to combinations of utensil/end-effectors, containers, and materials/ingredients. The process stores the motion library (306) and receives an input goal having a material/ingredient and a quantity (e.g., amount, volume, mass, discrete number, etc.) (308). A random chooser (310) processes the motion library (306) and the input goal (308) and selects one of three next actions: (a) selecting a motion from the motion library (312), (b) selecting an exploration motion at random (314), and (c) selecting a motion from a learned model (e.g., learned model library 326) (316). After choosing one of the three (312, 314, 316), a robotic arm executes the selected motion (318). The process then measures the output of the executed motion (320). The process then collects and stores the data measured (322). In an embodiment, 100,000-1,000,000 actions are performed, collected, and stored, although a person having ordinary skill in the art can recognize that more actions can be performed. The process then applies reinforcement learning (324) which generates and updates a learned model library (326).

The above process therefore teaches the most effective motions by selecting actions by three different methods (312, 314, 316), executes those motions (318), measures the results (320, 322), and statistically determines the effectiveness of each motion over many (100,000 or more) iterations (324, 326). As such, the learned model library improves after each iteration. A person having ordinary skill in the art can further recognize that various models and neural networks can be employed in the machine learning described above.

Figure 4:
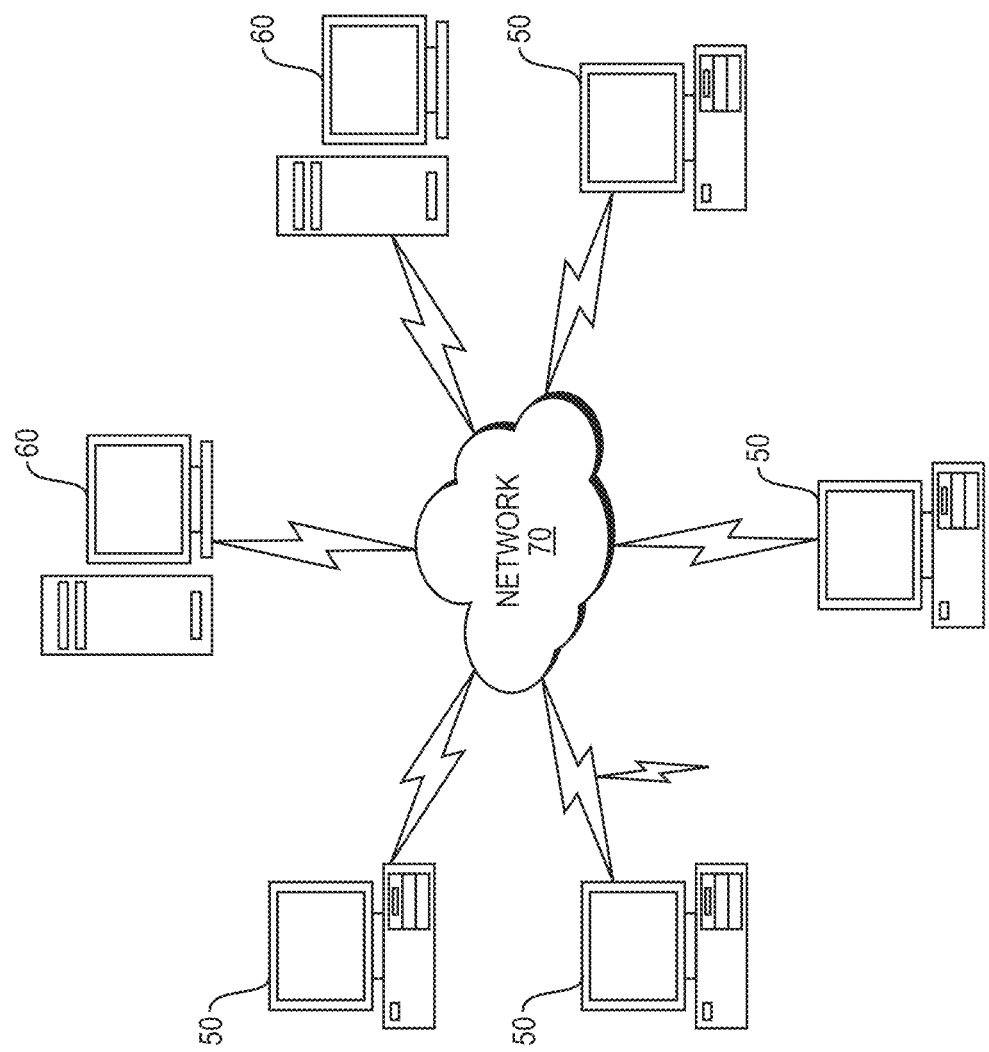
FIG. 4 illustrates a computer network or similar digital processing environment in which embodiments of the present disclosure may be implemented.

FIG. 4 illustrates a computer network or similar digital processing environment in which embodiments of the present disclosure may be implemented.

Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Figure 5:
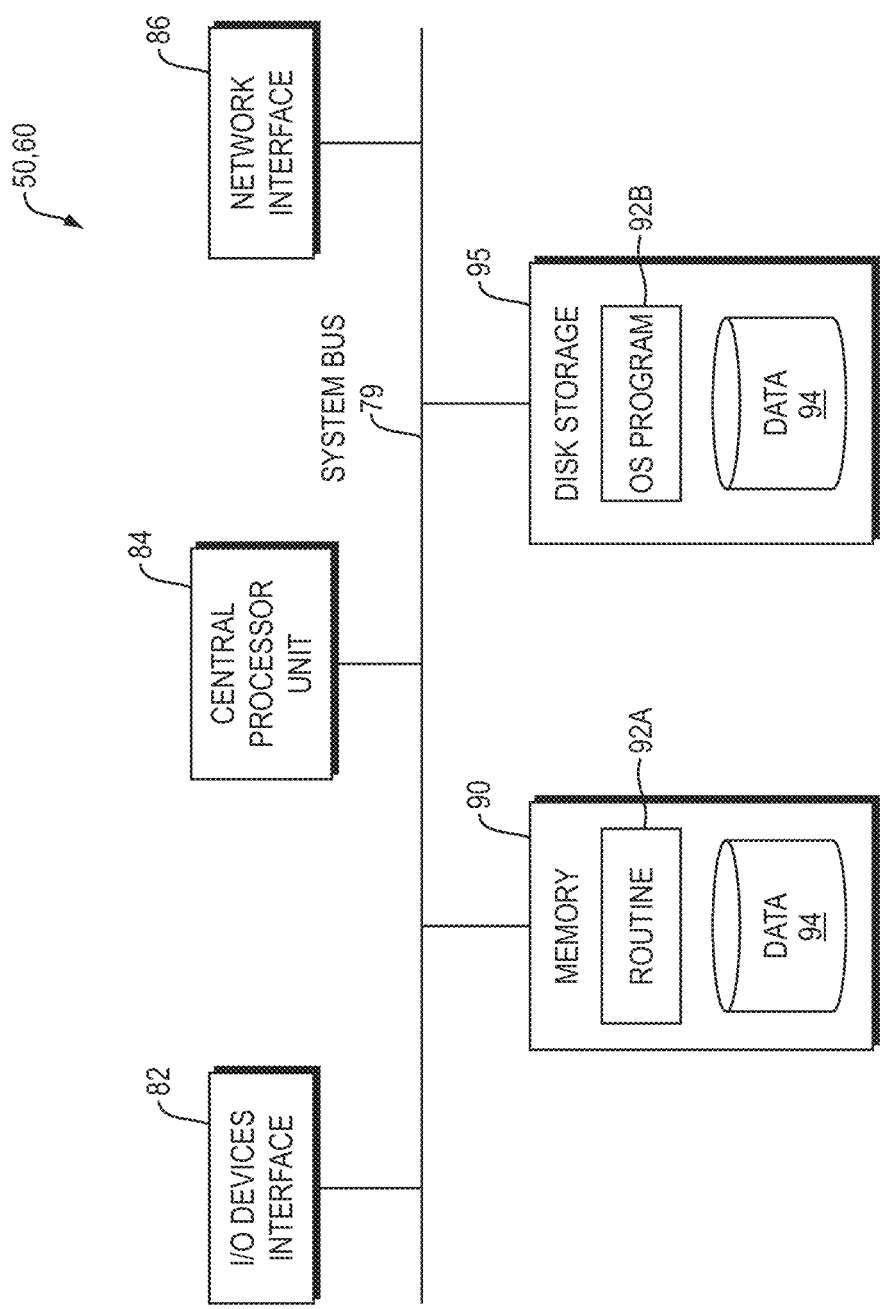
FIG. 5 is a diagram of an example internal structure of a computer (e.g., client processor/device or server computers) in the computer system of FIG. 5.

FIG. 5 is a diagram of an example internal structure of a computer (e.g., client processor/device 50 or server computers 60) in the computer system of FIG. 4. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 4). Memory 90 provides volatile storage for computer software instructions 92 and data 94 used to implement an embodiment of the present disclosure (e.g., motion library, CAD generation module, library generation module, random chooser module, learned model library module, and reinforcement learning module code detailed above). Disk storage 95 provides non-volatile storage for computer software instructions 92 and data 94 used to implement an embodiment of the present disclosure. A central processor unit 84 is also attached to the system bus 79 and provides for the execution of computer instructions.

In one embodiment, the processor routines 92 and data 94 are a computer program product (generally referenced 92), including a non-transitory computer-readable medium (e.g., a removable storage medium such as one or more DVD- ROM's, CD-ROM's, diskettes, tapes, etc.) that provides at least a portion of the software instructions for the disclosure system. The computer program product 92 can be installed by any suitable software installation procedure, as is well known in the art. In another embodiment, at least a portion of the software instructions may also be downloaded over a cable communication and/or wireless connection. In other embodiments, the disclosure programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals may be employed to provide at least a portion of the software instructions for the present disclosure routines/program 92.

The teachings of all patents, published applications, and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A method comprising:
   determining a set of trajectories for an articulated robot arm that collect an amount of deformable or fracturable material from a collection of deformable or fracturable materials, at least one sensor system of a machine having the articulated robot arm observing and generating a representation of the collection of deformable or fracturable material, determining the set of trajectories by calculating a path through the representation of the collection of materials based on (a) a volume of intersection or an estimate of the volume of the intersection between the end-effector and the deformable or fracturable material and (b) at least one physical reaction of the deformable or fracturable material with the end-effector, the robot arm being configured to move an end-effector able to manipulate the collection of materials;
   selecting a given trajectory of the trajectories based on at least one criterion; and
   sending the given trajectory to the machine configured to move the end-effector, causing the machine to execute the trajectory using measurements of the at least one sensor system to navigate the environment.

2. The method of claim 1, wherein executing the trajectory includes moving at least one of the end-effector and components of the machine within a threshold of the given trajectory.

3. The method of claim 1, wherein determining the trajectories includes determining a trajectory free from collision with an object in an environment based on at least one of the following: a physical model of the environment, and output from the at least one sensor systems.

4. The method of claim 1, wherein selecting the given trajectory includes employing a criterion based on at least one of the following:
   execution time,
   intersection volume,
   physical reaction of the material with the end-effector,
   proximity to collision with other objects,
   proximity to hardware physical constraints including at least one of joint limits, acceleration limits, velocity limits, and jerk limits,
   path length,
   required torque,
   required energy or effort, and
   additional computational effort.

5. The method of claim 1, further comprising determining at least one of an end-effector trajectory, a joint position, and a joint torque based on an estimated property of the material, the property including at least one of stiffness, viscosity, viscoelasticity, fracture toughness, material density, serving mass, serving volume, friction coefficient, and material grain size.

6. The method of claim 1, wherein selecting the given trajectory further includes, choosing the given trajectory based on the criterion having a numerical score, the numerical score including one or more of shortest joint-space distance, shortest end-effector distance, minimum energy, smallest maximum torque, shortest time, the amount of material, and largest clearance between obstacles.

7. The method of claim 1, further comprising:
   during execution of the given trajectory, compensating for errors in trajectory tracking based on:
   tracked position, tracked velocity, and tracked acceleration of at least one actuator of the robotic arm, the trajectory, the tracked velocity, and the tracked acceleration, being of at least one portion of the robot or a frame of the robot arm that can be transformed to one or more of the tracked position, tracked velocity, and tracked acceleration, or
   measured or inferred force or torque on at least one joint of the robotic arm, on an end effector of the robot arm, or on a frame of the robot arm that can be transformed to measured or inferred torque;
   maintaining at least one criterion, including one or more of a volume of material intersection and physical reaction of the material.

8. The method of claim 1, further comprising:
   determining the amount of material to be collected based on one or more of:
   direct computation of an intersection volume of an end-effector coupled with the machine for the given trajectory with the collection of materials and the physical reaction to the end-effector,
   an approximation of at least one of the volume and mass of the captured material established by a neural network or statistical model, and
   a heuristic function providing the amount of material to be collected by the end-effector for the given trajectory.

9. The method of claim 1, wherein selecting the given trajectory further includes:
   determining the amount of material to be collected in the end-effector by at least one of the trajectories in the set of trajectories, and
   selecting based on the amount of material to be collected; or
   employing a generation function based on the amount of material to be collected.

10. The method of claim 1, further comprising:
    determining a trajectory generation function by at least one of: an approximation function, adversarial training, adversarial training including using a generative adversarial network (GAN), or reinforcement learning;
    wherein the approximation function is generated by a neural network.

11. The method of claim 1, further comprising estimating a path of dispersing of the collected material into a predefined configuration and location based on at least one of an estimated viscosity, a viscoelasticity, a serving mass, a serving volume, a fracture toughness, and a density.

12. The method of claim 1, further comprising:
determining a destination for material collected by the robotic arm, and a destination configuration for the material collected, the destination configuration being one or more of a desired density distribution, voxel representation of the material, material surface, or a probability distribution of any of the prior representations.

13. The method of claim 1, further comprising:
determining, as part of the trajectory, removing the material from the end effector of the robotic arm.

14. The method of claim 1, further comprising:
creating a torque or effort profile for given material characteristics based on one or more of a tool geometry, an intersection profile with the material, non-linear effects of velocity and acceleration, and acceleration dependent forces.

15. The method of claim 1, further comprising:
adjusting, by at least one closed loop controller, a position, a velocity, an acceleration, or a torque of at least one actuator of the robotic arm, based on the at least one sensor, the at least one sensor including at least one of a camera, depth sensor input, robot position, and a torque sensor, causing the amount of collected material to be within a threshold of a goal amount;
employing an estimator to determine an intermediate system representation based on the sensor data, and determine a control output based on the intermediate system representation;
choosing an active controller from a set of closed loop controller based on which best matches the current conditions based on a quality metric;
wherein each of the closed loop controllers is configured to employ a set of operation conditions,
wherein each of the closed loop controllers is configured to be a neural network trained based on collected data or simulated data, the neural network being adversarily trained, and
wherein each of the at least one closed loop controllers may be tuned by reinforcement learning or optimization based on experiments.

16. A system comprising:
an end-effector;
an articulated robot arm;
a machine having the articulated robot arm, wherein the robot arm is configured to move the end-effector able to manipulate the collection of materials;
a processor; and
a memory with computer code instructions stored thereon, the processor and the memory, with the computer code instructions, being configured to cause the system to:
determine a set of trajectories for an articulated robot arm that collect an amount of deformable or fracturable material deformable or fracturable from a collection of material, at least one sensor system of a machine having the articulated robot arm observing and generating a representation of the collection of deformable or fracturable material, determining the set of trajectories by calculating a path through the representation of the collection of materials based on (a) a volume of intersection or an estimate of the volume of the intersection between the end-effector and the deformable or fracturable material and (b) at least one physical reaction of the deformable or fracturable material with the end-effector, the robot arm being configured to move an end-effector able to manipulate the collection of materials;
select a given trajectory of the trajectories based on at least one criterion; and
send the given trajectory to the machine configured to move the articulated robot arm and the end-effector, causing the machine to execute the trajectory using measurements of the at least one sensor system to navigate the environment.

17. The system of claim 16, wherein executing the trajectory includes moving the robotic arm within a threshold of the given trajectory.

18. The system of claim 16, wherein determining the trajectories includes determining a trajectory free from collision with an object in an environment based on at least one of the following: a physical model of the environment, or output from the at least one sensor system.

19. The system of claim 16, wherein selecting the given trajectory includes employing a criterion based on at least one of the following:
execution time,
intersection volume,
proximity to collision with other objects,
proximity to hardware physical constraints including at least one of joint limits, acceleration limits, velocity limits, and jerk limits,
path length,
required torque,
required energy or effort, and
additional computational effort.

20. The system of claim 16, further comprising determining at least one of an end-effector trajectory, a joint position, and a joint torque based on an estimated property of the material, the property including at least one of stiffness, viscosity, viscoelasticity, fracture toughness, material density, serving mass, serving volume, friction coefficient, and material grain size.

* * * * *